US010706419B2

(12) United States Patent
Ferguson et al.

(10) Patent No.: US 10,706,419 B2
(45) Date of Patent: Jul. 7, 2020

(54) SYSTEM AND METHOD FOR FINANCIAL TRANSACTION AUTHENTICATION USING TRAVEL INFORMATION

(71) Applicant: Visa International Service Association, San Francisco, CA (US)

(72) Inventors: William M. Ferguson, San Diego, CA (US); Steven A. Wickert, Oceanside, CA (US); Mary A. Reeder, Seattle, WA (US); Anu K. Pathria, San Diego, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/368,380

(22) Filed: Mar. 28, 2019

(65) Prior Publication Data

US 2019/0279209 A1    Sep. 12, 2019

Related U.S. Application Data

(63) Continuation of application No. 13/030,794, filed on Feb. 18, 2011, now abandoned.

(60) Provisional application No. 61/306,369, filed on Feb. 19, 2010.

(51) Int. Cl.
| G06Q 20/40 | (2012.01) |
| G06Q 20/18 | (2012.01) |
| G06Q 20/20 | (2012.01) |
| G06Q 30/06 | (2012.01) |
| G06Q 40/02 | (2012.01) |

(52) U.S. Cl.
CPC ............ *G06Q 20/40* (2013.01); *G06Q 20/18* (2013.01); *G06Q 20/20* (2013.01); *G06Q 20/4016* (2013.01); *G06Q 30/06* (2013.01); *G06Q 40/02* (2013.01)

(58) Field of Classification Search
None
See application file for complete search history.

(56) References Cited

U.S. PATENT DOCUMENTS

| 6,494,666 | B2 | 12/2002 | Wu et al. |
| 6,612,488 | B2 | 9/2003 | Suzuki |
| 6,832,721 | B2 | 12/2004 | Fujii |
| 6,868,391 | B1 | 3/2005 | Hultgren |
| 6,913,194 | B2 | 7/2005 | Suzuki |
| 6,948,656 | B2 | 9/2005 | Williams |
| 7,104,444 | B2 | 9/2006 | Suzuki |
| 7,152,788 | B2 | 12/2006 | Williams |
| 7,376,431 | B2 | 5/2008 | Niedermeyer |
| 7,500,607 | B2 | 3/2009 | Williams |
| 7,503,489 | B2 | 3/2009 | Heffez et al. |
| 7,594,605 | B2 | 9/2009 | Aaron et al. |
| 7,669,759 | B1 | 3/2010 | Zettner |
| 7,684,809 | B2 | 3/2010 | Niedermeyer |
| 7,697,942 | B2 | 4/2010 | Stevens |
| 7,715,824 | B2 | 5/2010 | Zhou |
| 7,720,702 | B2 * | 5/2010 | Fredericks ............. G06Q 10/02 705/13 |

(Continued)

*Primary Examiner* — Fateh M Obaid
(74) *Attorney, Agent, or Firm* — Kilpatrick Townsend & Stockton LLP

(57) ABSTRACT

Systems and methods for verifying a distant-from-home financial transaction related to a customer account based on travel indicators in earlier purchase transactions made by that customer.

20 Claims, 3 Drawing Sheets

(56) References Cited

U.S. PATENT DOCUMENTS

| | | | |
|---|---|---|---|
| 7,739,129 B2* | 6/2010 | Sweetland | G06Q 20/40 |
| | | | 705/2 |
| 7,743,981 B2 | 6/2010 | Willaims | |
| 7,747,535 B2 | 6/2010 | Mikan et al. | |
| 7,752,135 B2 | 7/2010 | Brown et al. | |
| 7,757,943 B2* | 7/2010 | D'Angelo | G06Q 20/341 |
| | | | 235/380 |
| 8,099,368 B2* | 1/2012 | Coulter | G06Q 20/02 |
| | | | 380/229 |
| 8,116,731 B2 | 2/2012 | Buhrrmann et al. | |
| 8,135,624 B1 | 3/2012 | Ramalingam et al. | |
| 8,140,403 B2 | 3/2012 | Ramalingam et al. | |
| 8,166,068 B2 | 4/2012 | Stevens | |
| 8,191,140 B2* | 5/2012 | Cohen | G06F 21/554 |
| | | | 705/2 |
| 8,209,755 B2* | 6/2012 | Cohen | G06F 21/554 |
| | | | 726/22 |
| 8,255,284 B1 | 8/2012 | Ramalingam et al. | |
| 8,280,348 B2 | 10/2012 | Snyder et al. | |
| 8,285,639 B2 | 10/2012 | Eden et al. | |
| 8,296,235 B2* | 10/2012 | Hrabosky | G06Q 20/26 |
| | | | 705/41 |
| 8,315,947 B2 | 11/2012 | Aaron et al. | |
| 8,332,321 B2* | 12/2012 | Bosch | G06Q 20/1085 |
| | | | 705/35 |
| 8,341,029 B1 | 12/2012 | Ramalingam et al. | |
| 8,374,634 B2 | 2/2013 | Dankar et al. | |
| 8,401,906 B2 | 3/2013 | Ruckart | |
| 8,588,748 B2 | 11/2013 | Buhrrman et al. | |
| 8,615,465 B2 | 12/2013 | Boutcher et al. | |
| 8,632,002 B2 | 1/2014 | Boutcher et al. | |
| 2002/0026416 A1* | 2/2002 | Provinse | G06Q 10/02 |
| | | | 705/39 |
| 2002/0032661 A1* | 3/2002 | Schuba | G06Q 20/02 |
| | | | 705/64 |
| 2002/0123938 A1* | 9/2002 | Yu | G06Q 30/06 |
| | | | 705/26.43 |
| 2003/0040987 A1* | 2/2003 | Hudson | G06Q 20/04 |
| | | | 705/30 |
| 2003/0065569 A1* | 4/2003 | Danis | G06Q 20/20 |
| | | | 705/21 |
| 2004/0167808 A1* | 8/2004 | Fredericks | G06Q 10/02 |
| | | | 705/5 |
| 2005/0239445 A1 | 10/2005 | Karaoguz et al. | |
| 2006/0131390 A1* | 6/2006 | Kim | G06Q 20/24 |
| | | | 235/380 |
| 2006/0271552 A1 | 11/2006 | McChesney et al. | |
| 2007/0055785 A1 | 3/2007 | Stevens | |
| 2007/0192249 A1* | 8/2007 | Biffle | G06Q 10/02 |
| | | | 705/44 |
| 2008/0022400 A1* | 1/2008 | Cohen | G06F 21/554 |
| | | | 726/22 |
| 2008/0054065 A1* | 3/2008 | D'Angelo | G06Q 20/341 |
| | | | 235/380 |
| 2008/0065530 A1* | 3/2008 | Talbert | G06Q 30/02 |
| | | | 705/38 |
| 2008/0086424 A1* | 4/2008 | Jambunathan | G06Q 20/10 |
| | | | 705/67 |
| 2008/0110983 A1* | 5/2008 | Ashfield | G06Q 20/24 |
| | | | 235/382 |
| 2008/0165060 A1 | 7/2008 | Songer et al. | |
| 2008/0167989 A1* | 7/2008 | Conlin | G06Q 20/0655 |
| | | | 705/44 |
| 2008/0257959 A1* | 10/2008 | Oved | G06Q 20/12 |
| | | | 235/380 |
| 2010/0023455 A1 | 1/2010 | Dispensa et al. | |
| 2011/0208601 A1* | 8/2011 | Ferguson | G06Q 20/18 |
| | | | 705/16 |
| 2012/0036073 A1* | 2/2012 | Basu | G06Q 20/40 |
| | | | 705/44 |
| 2012/0226570 A1* | 9/2012 | Kemp | G06Q 50/14 |
| | | | 705/26.1 |

* cited by examiner

SYSTEM AND METHOD FOR FINANCIAL TRANSACTION AUTHENTICATION USING TRAVEL INFORMATION

CROSS REFERENCES TO RELATED APPLICATIONS

This application is a continuation of U.S. patent application Ser. No. 13/030,794, filed Feb. 11, 2011, which claims priority to and the benefit of the filing date of U.S. Provisional Patent Application No. 61/306,369 filed Feb. 19, 2010, which are all herein incorporated by reference in their entirety.

FIELD OF THE INVENTION

This invention relates generally to authentication of financial account transactions (including non-monetary transactions or activities such as online banking logins) and, more specifically, to computerized authentication of transactions.

BACKGROUND OF THE INVENTION

Financial fraud detection systems often presume that there is increased risk when a transaction on a customer's account occurs far from home. Thus, when customers of financial institutions travel, it is common for their attempted financial transactions while on the road to be declined. The frequency of these declined transactions has been a chronic problem for the financial industry. A common characteristic of compromised financial instruments is having a transaction far from home take place on the account. However, more often than not, distant transactions are legitimate. When organizations frequently decline these transactions, they lose not only their reputation as a dependable financial institution, but also lose significant revenue from lost fees related to the declined transactions. New authentication solutions have been introduced such as out-of-wallet questions, Chip and PIN, and Secure Code. However, easy and convenient authentication of customers continues to be elusive. Furthermore, these solutions can be enormously expensive. Additionally, some potential users have considered them to be too expensive to implement. For example, banks in the United States have elected to forego Chip and PIN as an anti-fraud solution for credit and debit cards. Additionally, many solutions such as out-of-wallet questions are cumbersome and intrusive to the customer.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Systems and methods for financial transaction authentication using travel-related information are disclosed herein.

Systems and methods in accordance with an embodiment of the invention enhance existing financial transaction authentication solutions by analyzing travel-related purchase transactions for indications of future travel. When a bank normally would have flagged a distant-from-home transaction as risky, travel-related information can dramatically enhance the true understanding of the transaction risk, thereby ensuring better customer quality of service, increased authorizations and decreased false positive fraud indications.

Authentication using travel-related information provides financial institutions, processors and associations a new tool to increase approved transactions. From the resulting decreased fraud review workload in fraud operations centers, related organizations can transfer the new review capacity to finding additional fraudulent activities. To accomplish this, travel-related information is used that pertains to previously purchased travel-related transactions to identify the likelihood of future distant-from-home locations and timeframes of the bank customer. When a transaction occurs near locations that could be anticipated by an earlier transportation purchase by the bank customer, the transaction can be deemed less risky than if it were not known that the customer was going to be traveling to that location. The precise level of risk is determined by offline statistical modeling of variables generated from historic transaction data along with fraud results data. A statistical regression analysis or neural network modeling technique may be used, for example.

Financial institutions such as JPMorgan Chase & Co. (New York, N.Y. USA) and Citibank (New York, N.Y. USA), card associations such as Visa Inc. (San Francisco, Calif. USA) and MasterCard Worldwide (Harrison, N.Y. USA), processors such as Fiserv, Inc. (Brookfield, Wis. USA) and Total System Services, Inc. (TSYS) (Columbus, Ga. USA), and payment networks such as Automated Clearing House (ACH) and PayPal (San Jose, Calif. USA), rely on a combination of tools to attempt to authenticate financial transactions. Authentication using travel-related information strengthens current investments in authentication technology. For example, a currently installed fraud detection system may indicate that a Moscow-located transaction for a Houston-based customer looks highly risky. Using travel-related information, the Moscow transaction may be further analyzed by looking for a previous transaction for that customer for an airline-purchase transaction to or near Moscow. That planned-travel knowledge enables authentication solutions to better distinguish legitimate from truly risky distant transactions.

Figure 1:
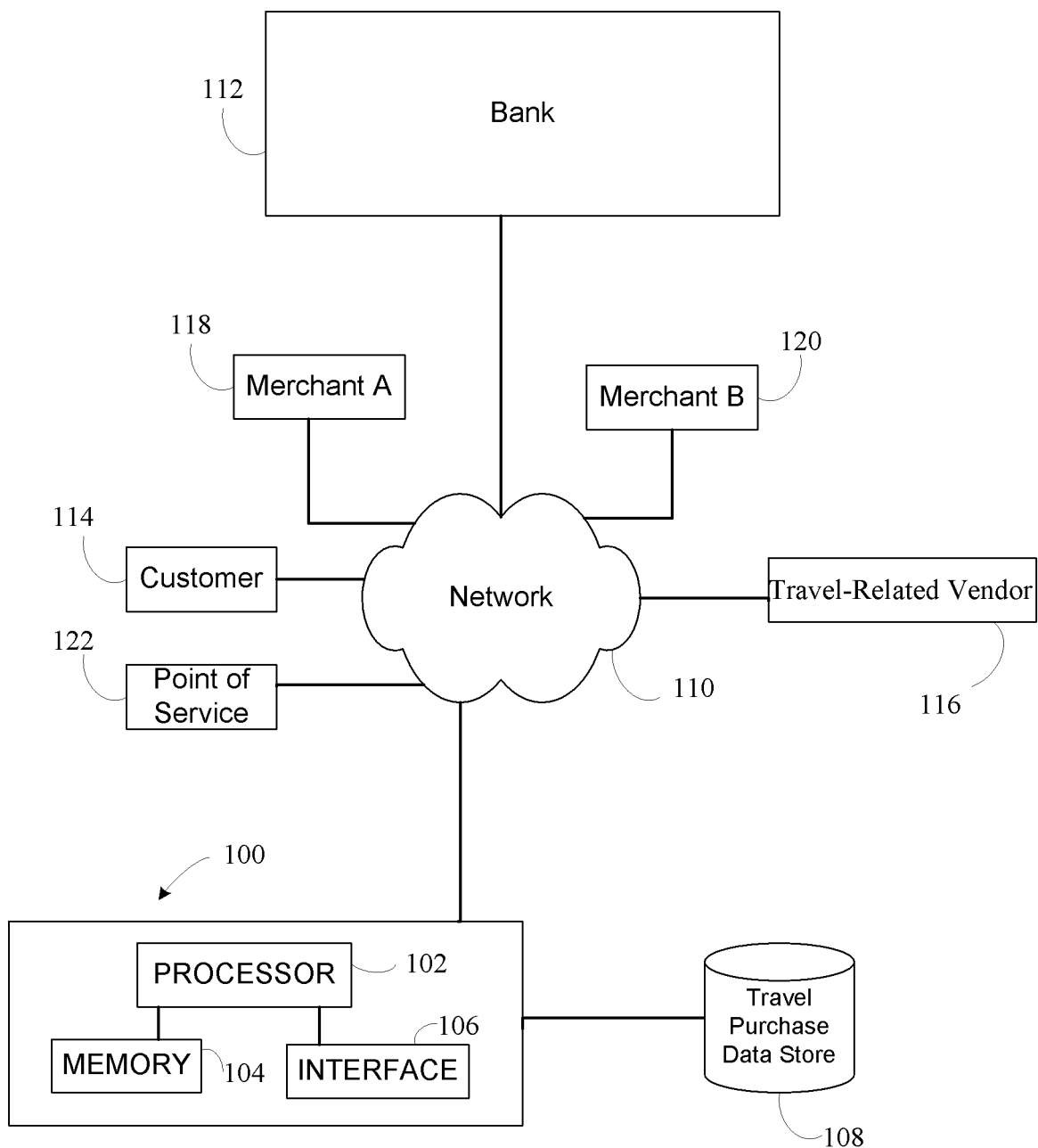
FIG. 1 is a diagram of a computerized system in a financial network environment used to provide transaction authentication based on previous travel purchase information.

FIG. 1 is a diagram of a computerized system 100 in a financial network environment used to provide transaction authentication using previous travel purchase information. The system 100 is referred to as a travel analysis platform in some embodiments of the invention. The system 100 includes a processor 102 in data communication with a memory 104 and an interface 106. The system 100 also includes a travel-related purchase data store 108 in data communication with the processor 102. The system 100 is also in data communication with a network 110, such as the Internet. A bank 112, a customer 114, a travel-related vendor 116, a first merchant 118 designated as Merchant A, a second merchant 120 designated as Merchant B, and a point of service 122 are also shown in data communication with the network 110.

In the example shown, the network 110 facilitates communication between the customer 114 and the travel-related vendor 116, between the point of service 122 and the bank 112, between the merchants 118 and 120 and the bank 112, and between the system 100 and the bank 112. However, in other embodiments, other forms of communication may be used between some or all of these entities. For example, a separate payment processing network may be used for communications between the bank 112 and the point of service 122 and/or between the bank 112 and the merchants 118 and 120. Although a processor, memory, and interface is shown only for the system 100, it should be understood that the bank 112, the customer 114, the travel-related vendor 116, the first merchant 118, the second merchant 120, and the point of service 122 operate and communicate with computerized systems. Additionally, the computerized systems may include a display that allows transaction approval and decline messages to be viewed by a user. For example, a screen may be present at the point of service 122 that shows an approval or decline message or a display on a computerized device such as a mobile phone operated by the customer 114 may show an approval or decline message for transactions performed with the mobile phone.

In an example embodiment, the bank 112 serves as a credit card issuer to the customer 114. The customer 114 uses the credit card to make purchases from the travel-related vendor 116, such as an airline or a travel agent and/or purchases from the first merchant 118 and the second merchant 120. Later, the customer 114 uses the credit card at the point of service 122 which is located in a location that is at least a predetermined distance from the home of the customer 114.

Generally, the system 100 is designed to authenticate transactions where banks are concerned with various types of fraud characterized by (among other things) remote-from-home activity. In an example embodiment, the system has the ability to provide financial transaction authentication for at least the following non-limiting use cases: purchase transactions with a debit or credit card at a physical merchant terminal location; purchase transactions with a debit or credit card at an online merchant; purchase transactions with an alternative payment network such as Paypal at an online merchant; ATM activity with a debit or credit card; online banking related to an account with a debit card or credit card; and mobile banking related to an account with a debit card or credit card.

Figure 2:
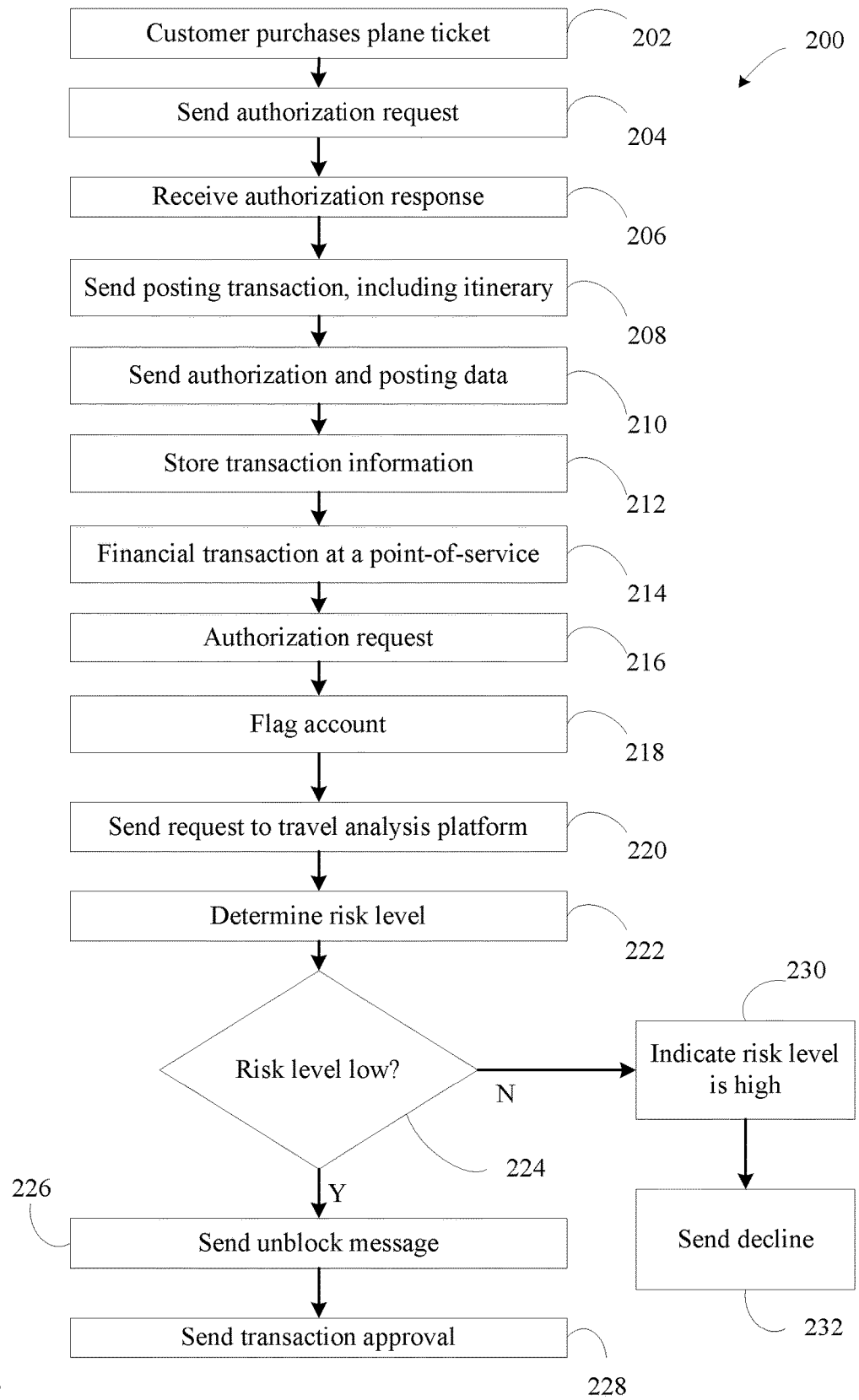
FIG. 2 is a flowchart of a method of authenticating financial transactions based on posting and authorization information.

FIG. 2 is a flowchart of a method 200 of authenticating financial transactions based on posting and authorization information. First, at a block 202, the bank customer 114 purchases a plane ticket for future distant travel from an airline or agent such as the travel vendor 116 with a bank card. Next, at a block 204, the airline or agent requests authorization from the card issuer such as the bank 112 for the ticket purchase. Next, at a block 206, the issuer bank 112 returns an authorization response message approving the transaction that is received by the airline or agent. Then, at a block 208, the airline or agent sends a posting transaction to the bank 112 including the itinerary for the ticket. A posting transaction generally triggers a money transfer from the issuer bank to the merchant bank. Generally the posting transaction message format provides for travel specific information such as detailed flight information. Next, at a block 210, the bank 112 sends the authorization and posting data for the ticket purchase to a travel analysis platform such as the system 100. Then, at a block 212, the travel analysis platform stores the transaction information (including the travel itinerary) in a database or other memory device such as the travel-related purchase data store 108.

Later, at a block 214, during the travel-related to the earlier plane ticket purchase, the customer performs a financial transaction at a point-of-service such as the point of service 122 (e.g., merchant POS, ATM, PC, Mobile Phone) far from home. Then, at a block 216, the point-of-service device sends an authorization request to the financial institution such as the bank 112 for approval. Next, at a block 218, the bank's legacy fraud system indicates that the remote transaction is high risk and the account is flagged to be blocked. Then, at a block 220, the same authorization request is sent to the travel analysis platform from the bank 112. In some embodiments, the authorization request sent to the travel analysis platform from the bank 112 may differ in some manner from the initial authorization request from the point of service 122 to the bank 112. In some embodiments a merchant can send additional information to the travel analysis program, such as IP address information, purchase information and/or information related to the purchaser like an IP address used. Next, at a block 222, the travel analysis platform analyzes historic transaction detail for the account including the airline ticket purchase relating to planned travel that matches the geographic area and date of the new transaction. In an example embodiment, the processor 102 analyzes information previously stored in the travel-related purchase data store 108 based on programming instructions stored in the memory 104. Then, at a decision block 224, the transaction analysis platform determines whether there is low risk from the new transaction.

If the risk level is determined to be low, a message is sent from the travel analysis platform to the bank 112 to unblock the account at a block 226. In some embodiments, an indicator that corresponds to a level of the risk determined by the system 100 is sent rather than an unblock message. Then, at a block 228, a transaction approval is sent from the bank 112 to the point of service 122 based on the information received at the bank 112 from the system 100.

If the service performs in real time, an authorization response is sent with "Approve." If the service performs in "one-behind" mode, the current transaction may still be blocked, but subsequent transactions could be approved. If it was determined at the decision block 224 that the risk level is not low, an indication is sent from the system 100 to the bank 112 that the risk level is high at a block 230. Then, at a block 232, a transaction decline is sent from the bank 112 to the point of service 122.

Figure 3:
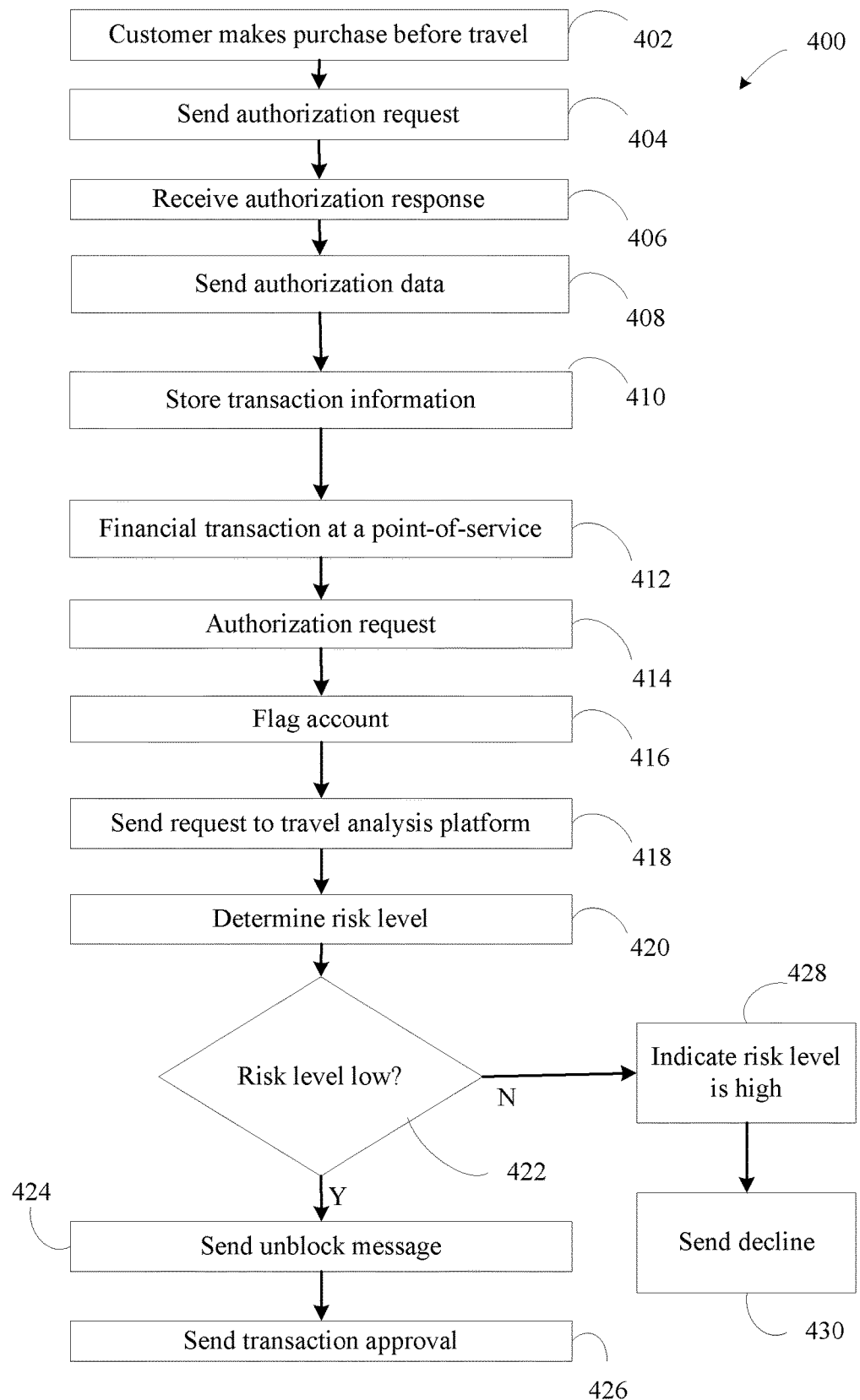
FIG. 3 is a flowchart of a method of providing transaction authentication based on bank card authorization transactions.

FIG. 3 is a flowchart of a method 400 of providing transaction authentication based on bank card authorization transactions. First, at a block 402, the bank customer 114 makes various purchases with a bank card before traveling at vendors such as the first merchant 118 and the second merchant 120, for example. Then, at a block 404 for each purchase, the merchants 118 and 120 request authorization from the card issuer such as the bank 112. Next, at a block 406, the issuer bank 112 returns an authorization response message for each transaction that is received by the merchants 118 and 120. Then, at a block 408, the bank 112 sends the authorization data for the pre-travel purchase to a travel analysis platform such as the system 100. Next, at a block 410, the travel analysis platform stores the transaction information in a database or other memory device such as the travel-related purchase data store 108.

Later, at a block 412, the customer 114 performs a financial transaction at a predetermined distance from their home location. Next, at a block 414, the point-of-service device 122 (e.g., merchant terminal, ATM, PC, Mobile Phone) sends an authorization request to a financial institution such as the bank 112 for approval. Then, at a block 416, a bank's legacy fraud system, which is complemented by the systems and methods disclosed herein, indicates that the remote transaction is high risk and the account is flagged to be blocked. Next, at a block 418, the same authorization request is sent from the bank 112 to the travel analysis platform. In some embodiments, the authorization request sent to the travel analysis platform from the bank 112 may differ in some manner from the initial authorization request from the point of service 122 to the bank 112. Then, at a block 420, the travel analysis platform analyzes historic transaction detail for the account including the travel-related purchase information that matches the geographic area and date of the new transaction. Next, at a decision block 422, the transaction analysis platform determines whether there is low risk from the new transaction.

If risk level is determined to be low, a message is sent from the travel analysis platform to the bank 112 to unblock the account at a block 424. In some embodiments, an indicator that corresponds to a level of the risk determined by the system 100 is sent rather than an unblock message. Then, at a block 426, a transaction approval is sent from the bank 112 to the point of service 122 based on the information received at the bank 112 from the system 100. If the service performs in real time, an authorization response is sent with "Approve." If the service performs in "one-behind" mode, the current transaction may still be blocked, but subsequent transactions could be approved. If it was determined at the decision block 422 that the risk level is not low, an indication is sent from the system 100 to the bank 112 that the risk level is high at a block 428. Then, at a block 430, a transaction decline is sent from the bank 112 to the point of service 122.

With regard to the methods 200 and 400 described in FIGS. 2 and 3 respectively, a number of variables may be derived for a modeling and scoring process performed by the system 100 for any given moment in a financial account in determining the risk level at the blocks 222 and 420. In an embodiment, the derived variables include geographic distance between the home address of the customer 114 and a location of the current transaction point of service 122, geographic distance between an airport on the travel itinerary (as identified in card posting data, for example) and the point of service location of the current transaction, and/or time difference between the current transaction and the expected on-the-ground period of the nearest airport on the travel itinerary (as identified in posting data, for example).

Still with respect to the methods 200 and 400, additional factors may also be used in deriving variables. For example, when traveling in the past, whether the customer has visited this particular merchant before, or this particular chain. If so, this may be indicative of current legitimate travel. An additional factor is whether the customer has recently made purchases at merchant types that are highly indicative of pending legitimate travel such as travel services, dry cleaning, pre-paid airport parking, pre-paid car rental, or hotel reservations, for example. This might be determined from analyzing whether the merchant identifiers from purchases are within numeric blocks of merchant identifiers reserved for hotels and car rentals, for example. In other embodiments the system may analyze factors such as seasonality of travel; property ownership, reward card points, and/or previous travel habits.

Additional factors related to airline ticket purchases may also be used. The magnitude of the price for airline ticket purchases may be used, for example. Pricing information may be indicative of distance and also indicative of the time window between when the travel was purchased and when the travel occurs. Other variables related to likely destination location and distance from home may also be used based on what air carrier the travel will be on. For example, Hawaiian Air flies between the contiguous United States to Hawaii and only a few other places. Airlines such as British Air, Aer Lingus, Aeroflot, Air Nippon, and Quantas do not fly domestic U.S. routes. Knowing the air carrier to be used by a legitimate customer can help predict the reasonableness of the locations of purchases made far from the customer's home location.

While the preferred embodiment of the invention has been illustrated and described, as noted above, many changes can be made without departing from the spirit and scope of the invention. For example, additional or fewer steps may be performed in the methods 200 and 400 and/or some of the steps may be performed in a different order or concurrently. Additionally, although the system 100 is shown as being separate from the bank 112, the system 100 may be integrated within the systems of the bank 112 rather than existing as a separate system accessed over a network. Although the method 200 uses card posting information including a travel itinerary and method 400 uses travel-related purchase information without posting information or an itinerary, some embodiments may incorporate aspects of both methods such that both travel itinerary information from card posting data and travel-related purchase information such as purchases from a car rental company could be used. Different or additional travel-related purchase data elements may also be used than those described. Accordingly, the scope of the invention is not limited by the disclosure of the preferred embodiment. Instead, the invention should be determined entirely by reference to the claims that follow.

The invention claimed is:

1. A method implementable in a computing system, comprising:
    storing, by at least one processing device of a travel analysis platform, an indication of a location of a pending travel destination in a memory device, the indication of the location of the pending travel destination based at least on a posting of a travel-related financial transaction, the posting resulting from a posting transaction that triggers a money transfer from an issuer bank to a merchant bank;
    receiving, by the at least one processing device, a current transaction authorization request for a current transaction from a point of service device at a merchant over a network;
    determining, by the at least one processing device, that a location of the point of service device and the location of the pending travel destination obtained from the posting of the travel-related financial transaction are within a predetermined distance;
    after determining that the location of the point of service device and the location of the pending travel destination are within the predetermined distance, determining, by the at least one processing device, that the current transaction is low risk by implementing by the travel analysis platform, an offline statistical modeling of variables generated from historic transaction data including the travel-related financial transation;
    generating, by the at least one processing device, a transaction approval indication when the location of the point of service device and the location of the pending travel destination are within the predetermined distance; and
    transmitting, by the travel analysis platform by the at least one processing device, the transaction approval indication to the point of service device and the merchant over the network.

2. The method of claim 1 further comprising:
storing a plurality of travel transactions relating to a travel event;
determining travel characteristics for a user based on the stored plurality of travel transactions;
generating the indication of the location of the pending travel destination based on determined travel characteristics; and
populating the memory device based on the determined travel characteristics.

3. The method of claim 2 wherein the travel-related financial transaction includes an airline ticket purchase.

4. The method of claim 3, wherein the predetermined distance is a first predetermined distance, and wherein the method further comprises:
determining an air carrier for the current transaction;
comparing the location of the point of service device with a known destination of the determined air carrier; and
generating the transaction approval indication when the known destination of the determined air carrier is within a second predetermined distance from the location of the point of service device.

5. The method of claim 4, further comprising:
comparing the location of the point of service device with historic transaction information; and
transmitting the transaction approval indication when the location of the point of service device matches the historic transaction information.

6. The method of claim 5, further comprising:
generating an indication of pending travel, based on one or more transactions that are suggestive of pending travel; and
populating the memory device with the generated indication of pending travel.

7. The method of claim 6, further comprising:
calculating a time period that the user is in a location based on at least one of distance from an airport or time between flights.

8. The method of claim 7, wherein the travel-related financial transaction is conducted using one or more of a bank card, online payment or a mobile bill payment.

9. The method of claim 8, wherein the travel characteristics are one or more of a flight date, flight time, arrival location, a hotel location.

10. The method of claim 9, further comprising:
estimating a distance of travel based on a price of an airline ticket; and
transmitting the transaction approval indication when the estimated distance of travel is within a predetermined threshold of an actual distance from a residence of the user.

11. The method of claim 1, further comprising:
using a computerized verification system, sending the transaction approval indication from the computerized verification system to a computerized payment network, wherein the transaction approval indication further comprises at least one of a risk score indicator or a binary risk indicator.

12. A computing system comprising a processor and a non-transitory computer readable medium comprising code, executable by the processor, to implement a method comprising:
storing, by at least one processing device of a travel analysis platform, an indication of a location of a pending travel destination in a memory device, the indication of the location of the pending travel destination based at least on a posting of a travel-related financial transaction, the posting resulting from a posting transaction that triggers a money transfer from an issuer bank to a merchant bank;
receiving, by the at least one processing device, a current transaction authorization request for a current transaction from a point of service device at a merchant over a network;
determining, by the at least one processing device, that a location of the point of service device and the location of the pending travel destination obtained from the posting of the travel-related financial transaction are within a predetermined distance;
after determining that the location of the point of service device and the location of the pending travel destination are within the predetermined distance, determining, by the at least one processing device, that the current transaction is low risk by impementing by the travel analysis platform, an offline statistical modeling of variables generated from historic transaction data including the travel-related financial transaction;
generating, by the at least one processing device, a transaction approval indication when the location of the point of service device and the location of the pending travel destination are within the predetermined distance; and
transmitting, by the travel analysis platform by the at least one processing device, the transaction approval indication to the point of service device and the merchant over the network.

13. The computing system of claim 12 wherein the method further comprises:
storing a plurality of travel transactions relating to a travel event;
determining travel characteristics for a user based on the stored plurality of travel transactions;
generating the indication of the location of the pending travel destination based on determined travel characteristics; and
populating the memory device based on the determined travel characteristics.

14. The computing system of claim 12, wherein the predetermined distance is a first predetermined distance, and wherein the method further comprises:
determining an air carrier for the current transaction;
comparing the location of the point of service device with a known destination of the determined air carrier; and
generating the transaction approval indication when the known destination of the determined air carrier is within a second predetermined distance from the location of the point of service device.

15. The computing system of claim 12, wherein the method further comprises:
comparing the location of the point of service device with historic transaction information; and
transmitting the transaction approval indication when the location of the point of service device matches historic transaction information.

16. The computing system of claim 12, wherein the method further comprises:
generating an indication of pending travel, based on one or more transactions that are suggestive of pending travel; and
populating the memory device with the generated indication of pending travel.

17. The computing system of claim 12, wherein the method further comprises:

calculating a time period a user is in a location based on at least one of distance from an airport or time between flights.

18. The computing system of claim 12 wherein the travel-related financial transaction is conducted using one or more of a bank card, online payment or a mobile bill payment.

19. The computing system of claim 12 wherein travel characteristics are one or more of a flight date, flight time, arrival location, or a hotel location.

20. The computing system of claim 12, wherein the method further comprises:
   estimating a distance of travel based on a price of an airline ticket; and
   transmitting the transaction approval indication when the estimated distance of travel is within a predetermined threshold of an actual distance from a residence of a user conducting the current transaction.

\* \* \* \* \*